United States Patent [19]
Williams, Jr.

[11] 3,851,720
[45] Dec. 3, 1974

[54] MULTIPLE MODE COMPUTING SCALE SYSTEM

[75] Inventor: Roger B. Williams, Jr., Sylvania, Ohio

[73] Assignee: Reliance Electric Company, Toledo, Ohio

[22] Filed: June 27, 1973

[21] Appl. No.: 373,908

[52] U.S. Cl.................................. 177/3, 235/58 PS
[51] Int. Cl.............................................. G01g 23/38
[58] Field of Search.......................... 177/1–4, 129, 177/25, 164; 235/58 PS, 61 PS, 151.33

[56] References Cited
UNITED STATES PATENTS

| | | | |
|---|---|---|---|
| 3,109,091 | 10/1963 | Allen | 177/DIG. 1 X |
| 3,181,633 | 5/1965 | Worst | 235/61 PS |
| 3,205,956 | 9/1965 | Bell et al. | 235/151.33 |
| 3,276,526 | 10/1964 | Loshbough | 177/3 |
| 3,329,807 | 7/1967 | Currie, Jr. et al. | 177/3 X |
| 3,393,302 | 7/1968 | Cichamowicz et al. | 177/25 X |
| 3,532,865 | 10/1970 | Karp et al. | 177/3 X |
| 3,587,759 | 6/1971 | Susor | 177/4 |
| 3,725,656 | 4/1973 | Fukuma | 177/25 X |
| 3,740,536 | 6/1973 | Takahashi et al. | 177/25 X |
| 3,741,324 | 6/1973 | Boshinski et al. | 177/3 |

Primary Examiner—Stephen J. Tomsky
Assistant Examiner—Vit W. Miska
Attorney, Agent, or Firm—Thomas H. Grafton

[57] ABSTRACT

A system for successively weighing a plurality of articles, computing the value of each weighed article and printing records of the weight and value of each article having two different modes of operation. In a first operating mode, a stored tare weight for the article container and stored price information are automatically cleared either each time a record is printed or each time a weighed article is removed from the system. The price information may be in the form of either price per unit weight or price per fractional unit weight. In a second operating mode, the price information is restricted to price per unit weight and the stored tare weight and price information are not cleared automatically.

3 Claims, 2 Drawing Figures

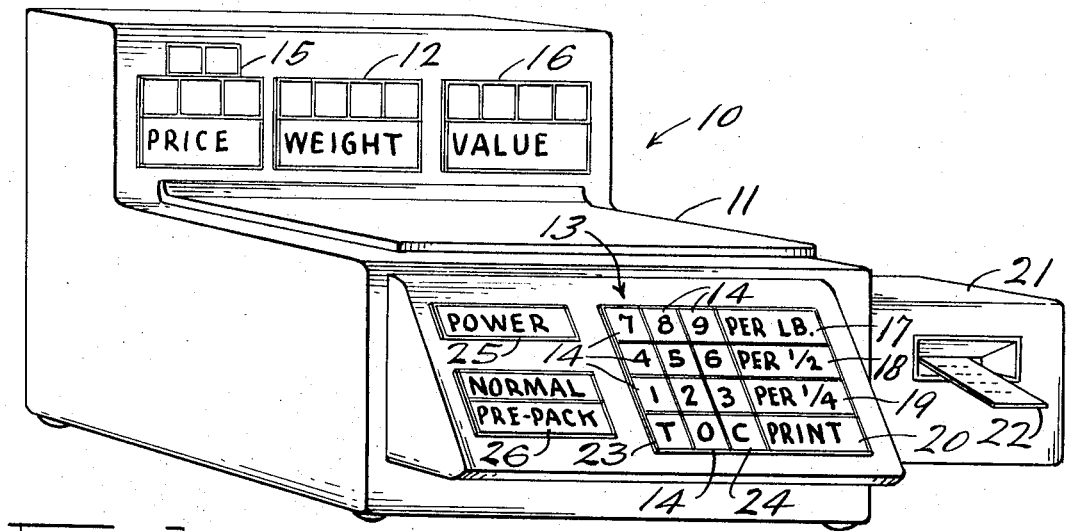
FIG-1-
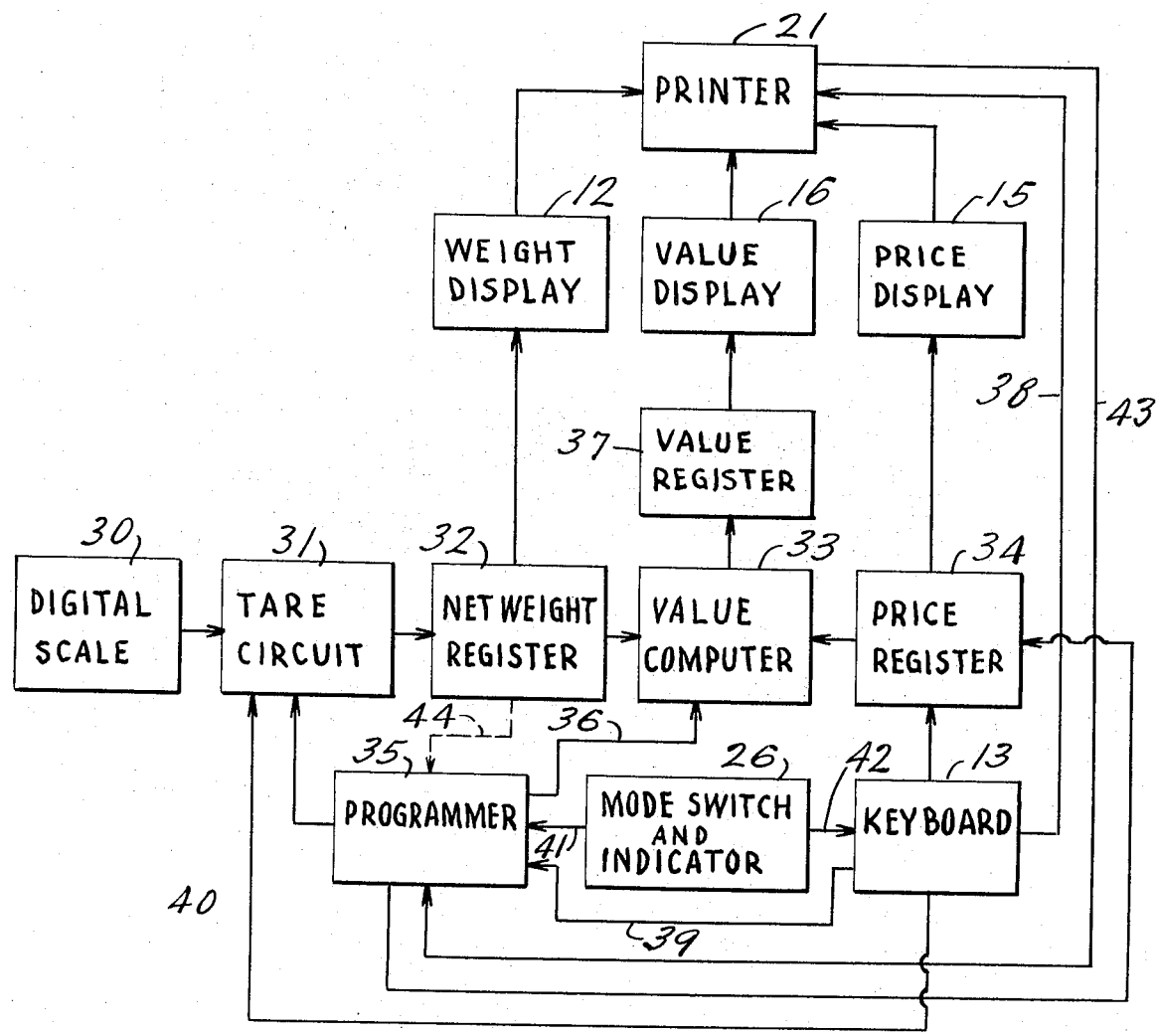
FIG-2-

MULTIPLE MODE COMPUTING SCALE SYSTEM

BACKGROUND OF THE INVENTION

This invention relates to a value computing scale system and more particularly to a scale system for weighing, computing and printing a record of the weight and value of each of a plurality of weighed loads having multiple modes of operation.

Weighing systems have been designed and built for performing various functions. One type of weighing system which has been developed and improved in recent years is an electronic digital computing scale system suitable for use in specialty food stores such as delicatessens. These systems are designed to accurately weigh and compute the value of foods and similar articles. The measured weight and computed value appear on a digital display for the benefit of the customer and may also be printed on an adhesive backed label for attachment to the food package. Some newer systems of this type also include frictional pricing. For fractional pricing, the system operator enters a price in a keyboard and then selects a key to indicate that the price is, for example, per quarter pound, per half pound or per pound. When a fractional price is used, the computer may be programmed to automatically multiply the entered price by the proper factor to calculate a price per unit weight and then use the calculated price for computing value. After the value is computed, the weight and value are printed on a label. Since printing completes a cycle of the system, the price information and any tare weight for the package may be cleared automatically to prepare the system for the next article to be weighed and priced. Or, the price information and the tare weight may be cleared automatically when the article is removed from the scale. A weighing system having fractional pricing is often valuable in delicatessens where specialty foods have very high prices. This is due to the fact that a consumer is much more likely to buy meats, cheeses and other high priced products at a price of $2.00 per quarter pound than the same products at a price of $8.00 per pound.

Food markets and delicatessens also often prepackage foods and particularly meats and cheeses. In pre-packaging foods, the values of a number of similar articles are successively computed. After articles are packaged, the system operator enters a common price per pound and an average tare weight into the system. The price information and tare weight are then stored until manually cleared after all of the similar articles are weighed and their values are computed. The operator then successively weighs each article and applies to each a printed label indicating the article weight and computed value. Government regulations often prevent the use of fractional pricing when pre-packaging foods, since the label may mislead the consumer into believing that the price is per unit weight rather than per fractional weight. Therefore, a computing scale system must be incapable of fractional pricing when it is used for pricing pre-packaged food.

In the past, computing scale systems have generally been designed to operate in a single mode. When such systems have been designed for operating in multiple loads, the difference has generally been between the presence and absence of tare weight compensation selectively to provide net and gross weight readings. Or, the systems have been of the type shown in U.S. Pat. No. 3,561,551, issued on Feb. 9, 1971 in the name of William C. Susor. This patent discloses a multiple load scale system capable of operating either in a retail mode in which a single package or article is weighed and the value of such article is computed or in a wholesale mode in which the value of a plurality of packages is computed.

SUMMARY OF THE INVENTION

According to the present invention, a value computing scale system is adapted to operate in a first mode in which the value may be computed from either a price per fractional unit weight or a price per unit weight and in which the price information and any stored tare weight are cleared automatically either after a label is printed or after the weighed article is removed from the scale and in a second mode in which successive pre-packaged articles having the same average tare weight are valued from a single price per unit weight without the need for reentering the tare weight and the price information for each article. The system generally comprises a digital weighing scale, a value computer, a printer and a keyboard for entering the tare weight and the price information into the computer. Stored price information and the net weight of an article being priced are supplied to the computer for calculating a value. The value of the article is then computed and displayed along with the price information and the net weight. The printer then may be commanded to print the value, the net weight and the price information on a label for attachment to the article.

The system is provided with a switch for selecting one of two modes of operation. In the first setting, the system is programmed to automatically clear the stored tare weight and stored price information. This mode of operation is used for over-the-counter sales where the tare weight and the price varies from article to article. Also, in the first mode of operation the price information may be in the form of either a price per unit weight or a price per fractional unit weight, such as $1.49 per one-quarter pound. In the second mode of operation, the system is adapted for use in weighing a number of pre-packaged articles all having the same average tare weight and the same price per unit weight. In this mode of operation, fractional pricing is inhibited and the system is inhibited from automatically clearing the tare weight and price information memories. The system is manually cleared after all similar articles are priced. An indicator is provided for indicating the mode in which the system is operating. Thus, the present invention permits the use of a single computing scale for performing different functions in, for example, a delicatessen or a butcher shop.

Accordingly, it is a preferred object of the present invention to provide an improved system for weighing, computing and printing records of the weight and value of articles.

Another object of the present invention is to provide a digital weighing and computing scale capable of functioning in two different modes of operation.

Other objects and advantages of the invention will become apparent from the following detailed description, with reference being made to the accompanying drawings.

BRIEF DESCRIPTION OF THE DRAWINGS

FIG. 1 is a perspective view of apparatus constructed in accordance with the present invention for weighing, computing and printing records of the weight and value of articles; and FIG. 2 is a block diagram illustrating the general organization and arrangement of a system according to the present invention for weighing, computing and printing records of the weight and value of articles.

DESCRIPTION OF THE PREFERRED EMBODIMENTS

Turning now to FIG. 1, apparatus 10 for weighing, computing and printing the records of the weight and value of articles is shown according to the present invention. The apparatus 10 includes a platter 11 on which articles to be weighed are placed. An article weighed on the platter 11 may, for example, consist of a cut of meat or a piece of cheese. The weight of articles on the platter 11 appears on a digital indicator 12 which may, for example, display up to 99.99 pounds. The apparatus 10 is also provided with a keyboard 13 which functions as an input device for entering information into the apparatus 10. The keyboard 13 is provided with 10 keys 14 for selectively entering price information, one digit at a time. The apparatus 10 is designed for accepting three digits of a price, up to $9.99, which is displayed on a digital price indicator 15. The apparatus 10 then computes a value from the stored price and the measured weight of an article on the platter 11 and displays such value on a digital indicator 16.

The price information entered into the apparatus 10 may be in the form of a price per unit weight or in the form of a price per fractional unit weight for the normal or retail sale mode of operation. In the embodiment shown in FIG. 1, a key 17 is provided for entering a price per pound, a key 18 is provided for entering a price per half pound and a key 19 is provided for entering a price per quarter pound. It will be appreciated that other keys may also be provided, where desired, for entering prices for other fractional unit weights. When the price per half pound key 18 is pushed, a portion of the price indicator 15 is illuminated to annunciate this. Similarly, another portion of the price indicator 15 indicates when the price per quarter pound key 19 has been pushed. The price information is entered into the apparatus 10 merely by sequentially pressing from one to three of the keys 14 and subsequently pressing the desired one of the keys 17–19.

After the value of a weighed article is computed and displayed on the indicator 16, a key 20 may be pressed to cause a conventional printer 21 to print a label 22. The label 22 may then be applied to the article by means of an adhesive backing.

The keyboard 13 is also provided with a "tare" key 23. The tare weight of an article container may be entered automatically into or stored by the apparatus 10 merely by placing the empty container on the platter 11 and pressing the tare weight key, which returns the weight shown in the indicator 12 to zero. The stored tare weight and the stored price information may be manually cleared by means of a "clear" key 24. It will, of course, be appreciated that the apparatus 10 may also be adapted to manually enter a tare weight by the keys 14 or by an additional set of switches (not shown). The digits of the tare weight may be punched on the keys 14 and subsequently transferred to a tare weight memory by pushing the tare key 23. Two additional switches are also provided on the apparatus 10. An illuminated power switch 25 is provided to turn on the apparatus 10 and simultaneously indicate when the apparatus 10 is on. Finally, an indicator switch 26 is provided for selecting the mode of operation of the apparatus 10 and simultaneously indicating the operating mode selected.

In a first setting of the mode switch 26, the apparatus 10 is designed for normal over-the-counter or retail sales. Each of the switches 17–19 is enabled for selectively entering price per pound, price per half pound or price per quarter pound. Since successively weighed articles will have different tare weights and different prices, the stored tare weight and the stored price information is cleared automatically either after a label 22 is printed or when the weighed article is removed from the platter 11. This may be accomplished, for example, by generating a "clear" pulse when the net weight drops below a preselected low weight, such as 0.1 pound. This method of clearing may be preferred since the system is cleared even when a customer decides against making a purchase and no label is printed. However, both of these methods for clearing a system of this type are known in the art.

In a second or pre-package mode of operation, the apparatus 10 is set up for successively pricing a number of packages having the same price per pound and the same tare weight. In this mode of operation, the price per half pound switch 18 and the price per quarter pound switch 19 are inhibited and the stored tare weight and price information are not cleared automatically. The system is manually cleared by means of the key 24 after all similar articles are priced.

Turning now to FIG. 2, a block diagram is provided to show the operation of the apparatus 10 for weighing, computing and printing records of the weight and value of articles. The basic apparatus may be of conventional type such as the price computing and marking apparatus shown in U.S. Pat. No. 3,453,422 which issued on July 1, 1969 in the name of William C. Susor or in U.S. Pat. No. 3,329,807 which issued on July 4, 1967 in the name of H. A. Currie, Jr. et al. However, the system shown in U.S. Pat. No. 3,329,807 may be modified into an entirely electronic system by replacing the mechanical scale and optical decoder with an entirely electronic scale such as that shown in U.S. Pat. No. 3,709,309 which issued on Jan. 9, 1973 in the name of Roger B. Williams, Jr. et al.

According to the present invention, a digital scale 30 produces a signal corresponding to the gross weight of an article being weighed. The gross weight is applied to a circuit 31 which compensates for tare weight. Prior to weighing an article, the tare weight for the article container is stored in a register or memory in the circuit 31. The stored tare weight is subtracted from the gross weight and the resulting net weight is stored in a register 32. The output of the net weight register 32 is applied to a computer 33 which calculates the value of the weighed article. Price information also must be supplied to the computer 33 for use in calculating the value of articles being weighed. Push button switches or other suitable types of switches on the keyboard 13 may be used for manually entering price information into a price register 34 which applies such stored price information to the computer 33. A programmer 35 applies timing and control signals over a lead 36 for causing the computer 33 to periodically calculate a new value and store such calculated value in a register 37.

The net weight stored in the register 32 is applied to the weight display 12, the value stored in the register 37 is applied to the value display 16 and the price information stored in the register 34 is applied to the price display 15 for supplying information to an operator for the system and, for retail sales, also to a customer. This information is supplied to the printer 21 which prints labels for applying to the weighed and priced articles.

Where the scale is to be used for retail sales, it is generally desirable to have a manual control for the printer. Therefore, the key 20 is provided on the keyboard 13 for applying a signal over a lead 38 to manually actuate the printer 21 to print the weight, the price information and the computer value for an article weighed on the scale 30. For over-the-counter retail sales, a label is printed only after the customer has had an opportunity to consider the weight and value of an article. If the weight and value are acceptable, the operator then pushes the print key 20 on the keyboard 13 to cause a label to be printed.

In retail sales, it is also desirable to have the option of using a price per fractional unit weight in addition to a price per unit weight. When price information is stored in the register 34, a signal is applied over a lead 39 to the programmer 35. The programmer 35 then causes the computer to calculate a value per unit weight if the price information is in the form of a price per fractional unit weight. Thus, if the price is, for example, $2.49 per half pound, the programmer 35 will cause the computer 33 to multiply by two to obtain a price of $4.98 per pound for use in calculating the value of the article being weighed. The keyboard 13 also includes a key for entering a tare weight into the tare weight compensation circuit 31. When the tare key on the keyboard 13 is actuated, a signal is applied on the lead 40 for storing in the circuit 31 the weight presently on the scale 30. When the tare key 23 is pushed to store a tare weight in the circuit 31, the weight appearing on the weight display automatically returns to zero. When the container is subsequently filled, the weight stored in the tare weight compensation circuit 31 is substracted from the gross weight and the resultant is stored in the net weight register 32. Finally, the keyboard 13 is provided with a key for clearing the tare weight stored in the circuit 31 and the price information stored in the register 34. When the price information is cleared from the register 34, the computer value stored in the register 37 will automatically go to zero.

According to the present invention, the mode switch and indicator 26 is connected over a lead 41 to the programmer 35 and over a lead 42 to the keyboard 13. The mode switch may be set either in a first or normal operating mode or in a second or pre-package operating mode. In the normal mode of operation, which is used for over-the-counter retail sales, the price information stored in the register 34 may be either in the form of a price per unit weight or in the form of a price per fractional unit weight, as described above. In one embodiment, after a label is printed by the printer 21, a signal is applied from the printer 21 over a lead 43 to the programmer 35. This signal enables the programmer 35 to automatically clear the tare weight stored in the circuit 31 and the price information stored in the register 34, thereby preparing the apparatus for weighing, computing and printing information relating to another article having a different tare weight and different price information. In a second embodiment, the net weight register 32 is connected to the programmer 35 through a lead 44. The programmer 35 detects when the net weight stored in the register 32 drops below a predetermined low level, such as 0.1 pound, when an article is removed from the scale 30 and automatically clears the tare weight stored in the circuit 31 and the price information stored in the register 34.

In the second setting, the mode switch 26 applies a signal over the lead 42 to the keyboard 13 for inhibiting the entering of a price per fractional unit weight. Thus, the price stored in the register 34 must be price per unit weight, or in the United States price per pound, in the pre-package mode of operation. Furthermore, the mode switch 26 applies a signal over a lead 41 to the programmer 35 for preventing the programmer 35 from automatically clearing the tare weight stored in the circuit 31 and the price information stored in the register 34. Thus, in the pre-package mode of operation, a number of similar articles may be rapidly weighed and priced. It will be apparent that in the first mode of operation, the apparatus 10 for weighing, computing and printing the weight and value of articles is particularly suitable for use in over-the-counter retail sales, while in the second mode of operation, the apparatus 10 is particularly suitable for rapidly weighing and pricing a number of similar articles having substantially the same tare weight and the same price per pound. Furthermore, in the second mode of operation, the apparatus 10 is restricted to using a price per unit weight and therefore meets any government regulations which provide for such restriction. The mode switch and indicator 26 includes means for indicating at least when the apparatus 10 is in the pre-package mode. The indicator may be an illuminated legend plate on the switch 26, a separate indicator or any other suitable electrical or mechanical indicating means.

It will be appreciated that multiple mode features of this invention may be adapted to various types of commercially available apparatus for weighing, computing value and printing labels which indicate weight and value. It will also be apparent to those skilled in the art that various changes and modifications may be made in the above-described embodiment without departing from the spirit and scope of the claimed invention.

What I claim is:

1. A system for weighing, computing and printing records of the weight and value of articles having retail sales and pre-packing modes of operation and comprising, in combination, means for measuring the gross weight of the articles, means for storing a tare weight, means for calculating the net article weight from the measured weight and the stored tare weight, means for storing price information, computer means for computing the value of the weighed article from the net weight and the stored price information, means for supplying price per unit weight information to said price storing means, means for supplying price per fractional unit weight information to said price storing means, means for printing the net weight and the computed value for each weighed article, means for clearing said tare weight storage means and said price information storage means, switch means for selecting one or the other of said modes of operation and having a retail sales setting for enabling said clearing means for automatically clearing said tare weight storing means and said price information storing means after either each time a record is printed or each time a weighed article is removed from the system and having a pre-package setting for inhibiting said price per fractional unit weight supplying means and for inhibiting said clearing means from automatically clearing said tare weight storage means and said price information storage means, and indicator means separate from said switch means for indicating said pre-packaging mode of operation.

2. A system for weighing, computing and printing records of the weight and value of articles, as set forth in claim 1, wherein said clearing means includes means responsive to said printing means printing the net weight and the computed value when said switch means is in said retail sales setting for automatically clearing said tare weight storing means and said price information storing means.

3. A system for weighing, computing and printing records of the weight and value of articles, as set forth in claim 1, wherein said clearing means includes means responsive to the removal of an article being weighed from said gross weight measuring means when said switch means is in said retail sales setting for automatically clearing said tare weight storing means and said price information storing means.

* * * * *